United States Patent

Golen, Jr. et al.

(10) Patent No.: US 6,443,875 B1
(45) Date of Patent: Sep. 3, 2002

(54) TREADMILL MOTOR CONTROL

(75) Inventors: Emil S. Golen, Jr., Barrington; Young-Chul Kim, Hickory Hills, both of IL (US); Kenneth F. Lantz, Poquoson, VA (US); Robert J. Sutkowski, Naperville, IL (US)

(73) Assignee: Brunswich Corporation, Lake Forest, IL (US)

( * ) Notice: Subject to any disclaimer, the term of this patent is extended or adjusted under 35 U.S.C. 154(b) by 147 days.

(21) Appl. No.: 09/651,248

(22) Filed: Aug. 30, 2000

Related U.S. Application Data

(60) Provisional application No. 60/152,657, filed on Sep. 7, 1999, and provisional application No. 60/159,268, filed on Oct. 13, 1999.

(51) Int. Cl.$^7$ .............................................. A63B 22/02
(52) U.S. Cl. ........................................ 482/54; 482/51
(58) Field of Search ..................................... 482/51, 54

(56) References Cited

U.S. PATENT DOCUMENTS

| | | | |
|---|---|---|---|
| 5,533,951 A | 7/1996 | Chang | 482/54 |
| 5,643,142 A | 7/1997 | Salerno et al. | 482/54 |
| 5,650,709 A | 7/1997 | Rotunda et al. | |
| 5,856,736 A * | 1/1999 | Rotunda et al. | 482/54 |
| 6,042,514 A | 3/2000 | Abelbeck | 482/54 |
| 6,095,951 A * | 8/2000 | Skowronski et al. | 482/54 |
| 6,124,697 A | 8/2000 | Wilkerson | |

\* cited by examiner

*Primary Examiner*—Glenn E. Richman
(74) *Attorney, Agent, or Firm*—Michael B. McMurry

(57) ABSTRACT

A motor control for exercise treadmill having an AC motor is disclosed which includes various features to enhance operation of the treadmill. These features include a motor control that can vary by shifting or staggering the phases of drive signals applied to the motor in order to reduce treadmill frame vibration. The features also include having the motor controller increase the slip of the motor to improve low speed operation of the motor and to increase the amperage of the drive signals when the motor is operating at a given speed in order to maintain that speed. In addition, a power factor control circuit can be used to increase the efficiency of the motor.

13 Claims, 5 Drawing Sheets

TREADMILL MOTOR CONTROL

PROVISIONAL APPLICATION PRIORITY

Priority based on U.S. Provisional Application Nos. 60/152,657, filed Sep. 7, 1999, and 60/159,268, filed Oct. 13, 1999 is claimed under 35 U.S.C. §119(e).

FIELD OF THE INVENTION

This invention generally relates to exercise equipment and in particular to exercise treadmills having an AC motor control system.

BACKGROUND OF THE INVENTION

Exercise treadmills are widely used for performing walking or running aerobic-type exercise while the user remains in a relatively stationary position. In addition exercise treadmills are used for diagnostic and therapeutic purposes. Generally, for all of these purposes, the person on the treadmill performs an exercise routine at a relatively steady and continuous level of physical activity. One example of such a treadmill is provided in U.S. Pat. No. 5,752, 897.

Although exercise treadmills that use an AC motor to drive the belt have reached a relatively high state of development, they still have a number of problems involving treadmill frame resonance or vibration, low speed operation and power consumption.

SUMMARY OF THE INVENTION

It is therefore an object of the invention to provide an exercise treadmill having improved AC motor control.

An additional object of the invention is to shift the phase relationship of a three phase drive signal applied by the motor controller to the motor in order to minimize frame resonance.

Still another object of the invention is to provide a method to minimize frame resonance by staggering the phase relationship of the three phase drive signal applied by the motor controller to the motor.

A further object of the invention is to overcome operational problems of a three phase induction motor at low speed. By commanding the motor controller to present a drive signal of a frequency much higher than the desired motor speed to the motor at low speeds, a high slip, or difference between the driving signals circulating field and the actual motor speed, will result thereby improving low speed performance of the treadmill.

DETAILED DESCRIPTION OF THE INVENTION

Figure 1:
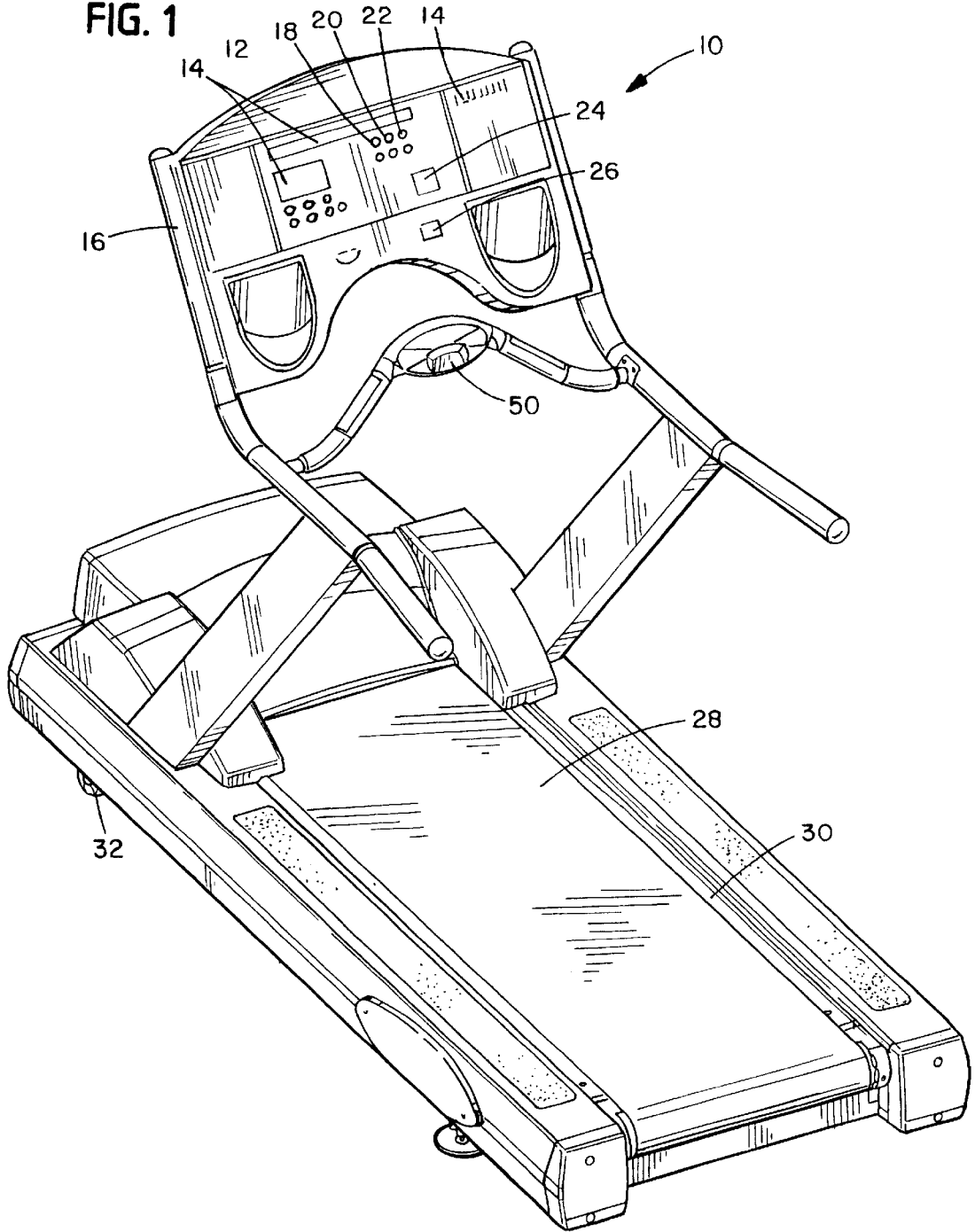
FIG. 1. is a perspective view of an assembled exercise treadmill according to the invention.

FIG. 1 shows the general outer configuration of an exercise treadmill 10, according to the invention. The treadmill includes a control panel 12 having a set of displays 14; a set of workout program control buttons 16; a set of operational controls 18–22 including a pair of time control buttons 18; a pair of incline control buttons 20 and a pair of speed control buttons 22; a numerical keypad 24; and a stop button 26. In addition, the treadmill 10 includes such conventional treadmill elements as a belt 28, a deck 30 and an inclination mechanism 32 of the type described in U.S. Pat. No. 6,095,951.

Figure 2:
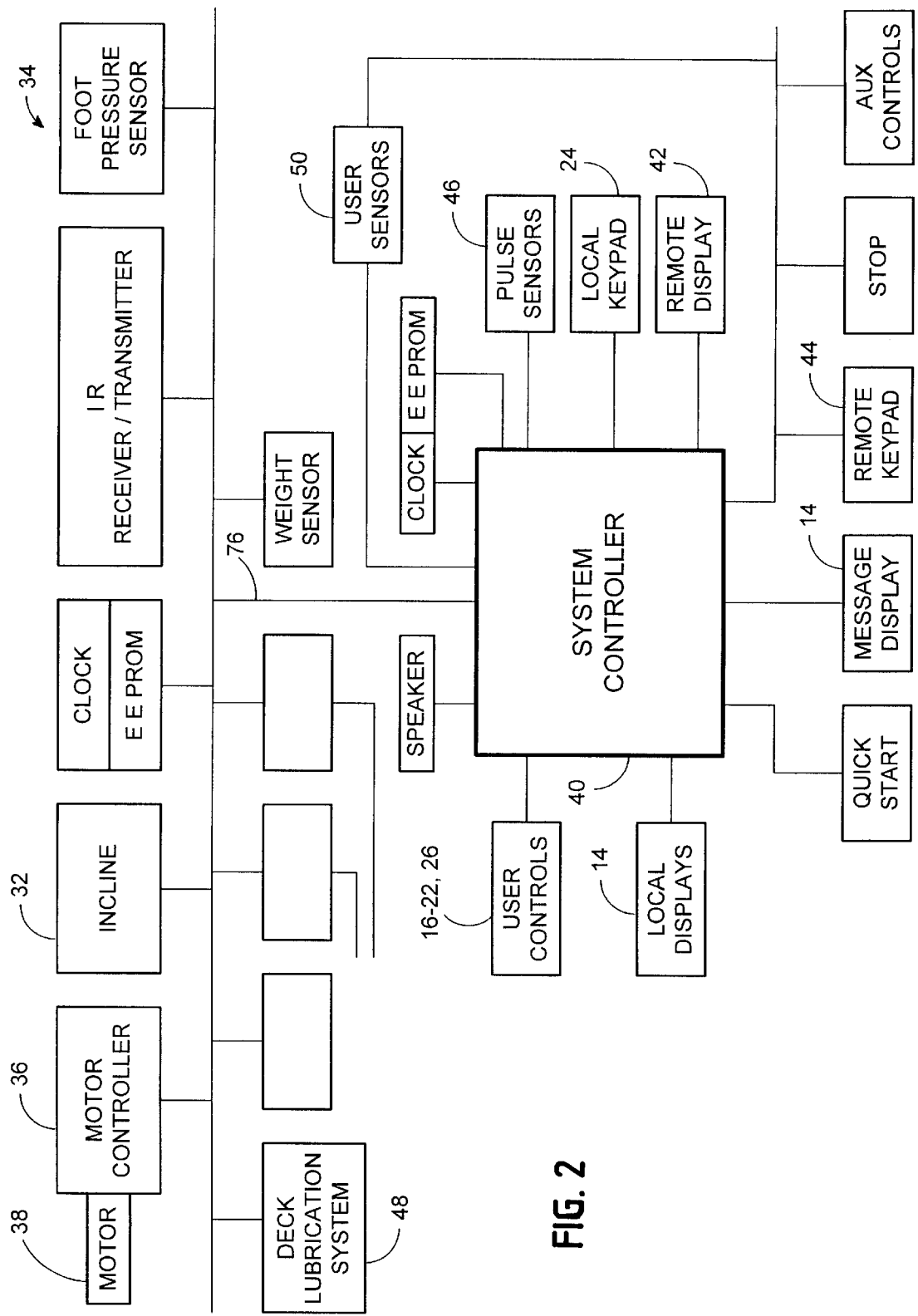
FIG. 2 is a block diagram of the control system for the treadmill of FIG. 1.

FIG. 2 is a representative block diagram of a control system 34 for the treadmill 10. The control system 34 is generally similar to the treadmill control systems of the type shown in FIG. 16 of U.S. Pat. No. 6,095,951 and controls an AC motor 38 having a motor controller 36 to propel the belt 28. The control system 34 uses a microprocessor based system controller 40 to control: the control panel displays 14 including the message display 14; the user controls 16–22 and 26; the keypad 24, an optional remote display 42; and a remote keypad 44. In addition, the control system 34 serves to control a heart rate monitoring system of the type described in U.S. Pat. No. 5,313,487 utilizing a set of pulse sensors 46 and a deck or belt lubrication system 48 of the type shown in U.S. Pat. No. 5,433,679 along with the inclination mechanism 32. The control system also controls a user detect or sense system 50.

Figure 3:
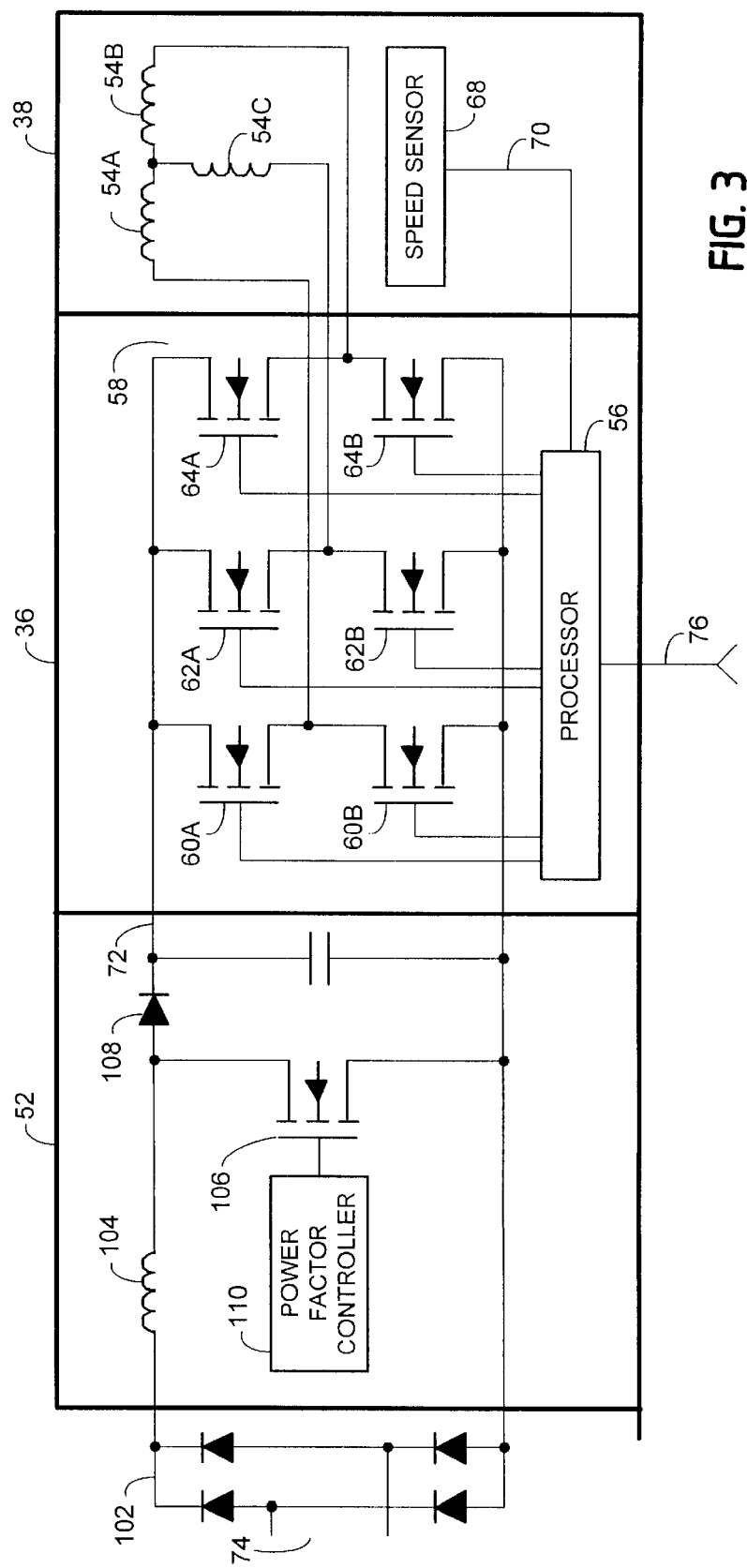
FIG. 3 is a schematic diagram of a motor control circuit for use with the control system of FIG. 2.

FIG. 3 provides an illustration of a preferred embodiment of the motor 38 and the motor controller 36 along with a power factor control circuit 52. Here, the three phase AC motor 38 having a set of three armature windings 54A–C is powered by the motor controller 36 having a microprocessor 56 which controls a three phase inverter 58 that includes a set of six paired power or drive transistors 60A–B, 62A–B and 64A–B and six associated freewheeling diodes (not shown). Two of the drive transistors 60A–B, 62A–B and 64A–B are connected to each of the armature windings 54A–C and are used for each phase leg. Each pair of the drive transistors 60A–B, 62A–B and 64A–B is in a complementary manner by the microprocessor 56. Normally the processor 56 controls the drive transistors 60A–B, 62A–B and 64A–B to generate three identical but 120 degrees phase shifted waveforms that are applied to the armature windings 54A–C. The amplitude and frequency of this waveform is determine by the desired motor speed. In the preferred embodiment, a speed sensor 68 integral with the motor 38 provides an input over a line 70 to the microprocessor 56 to close the motor speed control loop. The inverter 58 obtains power from a DC bus 72 which can be derived from a 110 volt, two phase power source 74 which can be a ordinary household power line. In embodiments that do not use the power factor control circuit 52, the current from the power source 74 is rectified and filtered to provide the DC bus voltage on line 72. For lower voltage AC power sources 74 (100–120VAC), the rectifiers and capacitors (not shown) are configured as a voltage doubler such that the DC bus voltage on the line 72 is the same for 120VAC with a doubler as it is for a 240VAC power source without the doubler.

Figure 4:
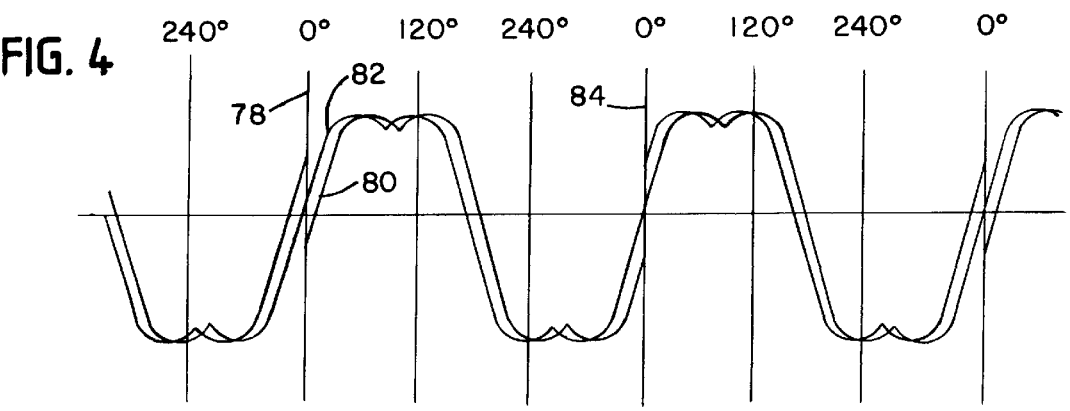
FIG. 4 is a phase diagram depicting a standard AC motor phase relationship.

FIG. 4 is a phase diagram representing shifting in the phase relationship of the three phase drive signal applied by the motor controller 36 to the armature windings 54A–C in order to minimize frame resonance. The motor controller processor 56 is connected to the system controller 50, as well as other components of the control system 34, over a communication bus 76. The processor 56 has direct control of the six drive transistors 60A–64B which apply to the motor armature windings 54A–C a three phase drive signal of varying amplitude and frequency. This is accomplished by pulse width modulating the three pairs of drive transistors 60A–64B in a complimentary fashion which generates an effective voltage at any point in time. The three phases offset in time by 120° present a space vector wave shape voltage to the armature windings 60A–64B. The voltage/frequency relationship is determined by the motor's 38 volt/hertz curve and the feedback signal from the speed sensor 68. In the preferred embodiment other signals are also used including voltage, motor current, and the motor controller 36 temperature. It has been found that in a certain motor rpm range, the drive signal generated by the standard volt/hertz curve and space vector modulation of the motor controller 36 causes the housing of the motor 38 to vibrate at a frequency corresponding to the resonant frequency of the frame of treadmill 10. This undesirable resonance causes an objectionable audible noise to the user and nearby observers besides being transmitted to the user's feet through the belt 28. Since the vibration is caused by the motor 38 and amplified by the frame of the treadmill 10, one solution is to smooth out the motor 38 so as to not generate the vibrations. Another less desirable solution is to make the It frame of the treadmill 10 non-resonant which can be a very difficult and costly proposition. By modifying the drive signal from the standard space vector modulation scheme it is possible to reduce the vibrations generated by the motor 38. The preferred technique uses phase shifting, on a per revolution basis shifting the phase of the drive signal to the motor armature windings 60A–64B. In the preferred implementation of this approach depicted in the phase diagram of FIG. 4, at the zero crossing of the first phase 78, a drive signal 80 is shifted back in time a few percent, for example 2%, relative to that of an unmodified drive signal 82. At the next zero crossing 84, the first phase is shifted ahead in time the same percentage relative to that of unmodified drive signal 82. Preferably, all the phases of all three of the drive signals are shifted at the same point in time which means the first phase at 0°, the second phase at 120° and the third phase at 240°. This shifting behind, then shifting ahead of the drive signal position relative to that of the unmodified drive signal 82 can substantially smooth out vibrations of the frame of the treadmill 10 when it occurs at or approximately near the resonant frequency of the frame of the treadmill 10. In the preferred embodiment, the phase shifting is controlled in such a manner by the processor 56 so as to be inactive at a minimum motor speed. It then scales up in a linear fashion to a target speed corresponding to the resonant frequency of the treadmill 10 at which point it is totally active. Then it scales down again in a linear fashion to a maximum motor speed where it is again inactive. This can insure smooth operation of the motor 38 and imperceptible transitions from inactive to active then inactive operation of the drive signal phase shifting while substantially reducing vibration induced in the frame of the treadmill 10.

Figure 5:
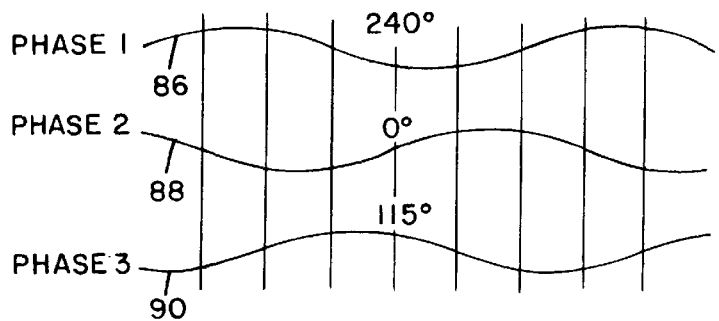
FIG. 5 is a phase diagram illustrating an AC motor phase relationship staggered from the relationship of FIG. 5 used to minimize frame resonance of the treadmill of FIG. 1.
Figure 6:
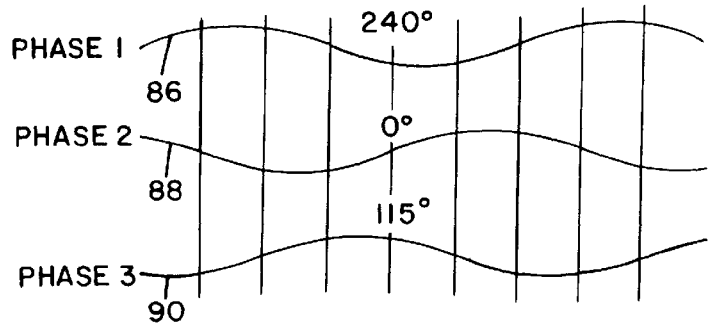
FIG. 6 is a phase diagram illustrating an AC motor phase staggering relationship used to minimize frame resonance of the treadmill of FIG. 1.

FIGS. 5 and 6 are phase diagrams illustrating an alternate method to minimize resonance of the frame of the treadmill 10 by staggering the phase relationship of the three phase drive signal applied by the motor controller 36 to the motor 38. This technique uses phase staggering, that is, staggering the phases of the drive signal to the armature winding 54A–C. This approach utilizes a change in the phase relationship from the standard relationship: a first phase 88 at 0°, a second phase 90 at 120° and a third phase 86 at 240° as shown in FIG. 5 to an anti-resonant phase relationship of where, for example, the first phase 88 is at 0°, the second phase 90 is at 115° and the third phase 86 is at 245° as shown in FIG. 6. Preferably, the staggering of the drive signals by the processor 56 is activated in a narrow band around the resonant frequency of the frame of the treadmill 10. This approach can result in a lower non-resonant vibration which is much less objectionable to the user and observers while greatly reducing the resonant vibration in the frame of the treadmill 10.

Figure 7:
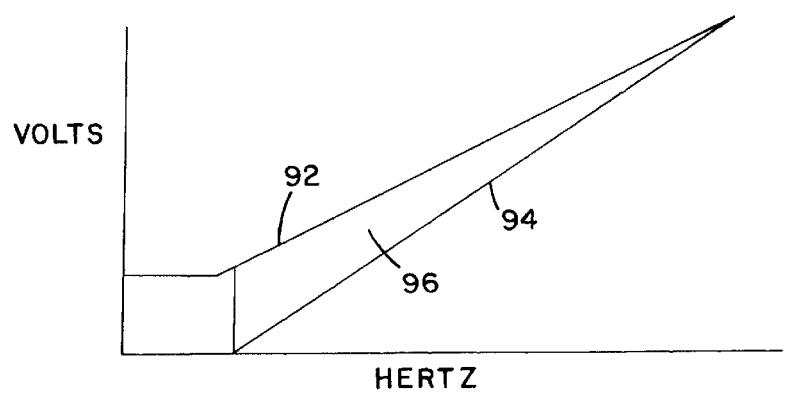
FIG. 7 is a voltage vs. frequency diagram illustrating an AC motor drive signal used to improve low speed operation of the treadmill of FIG. 1.
Figure 8:
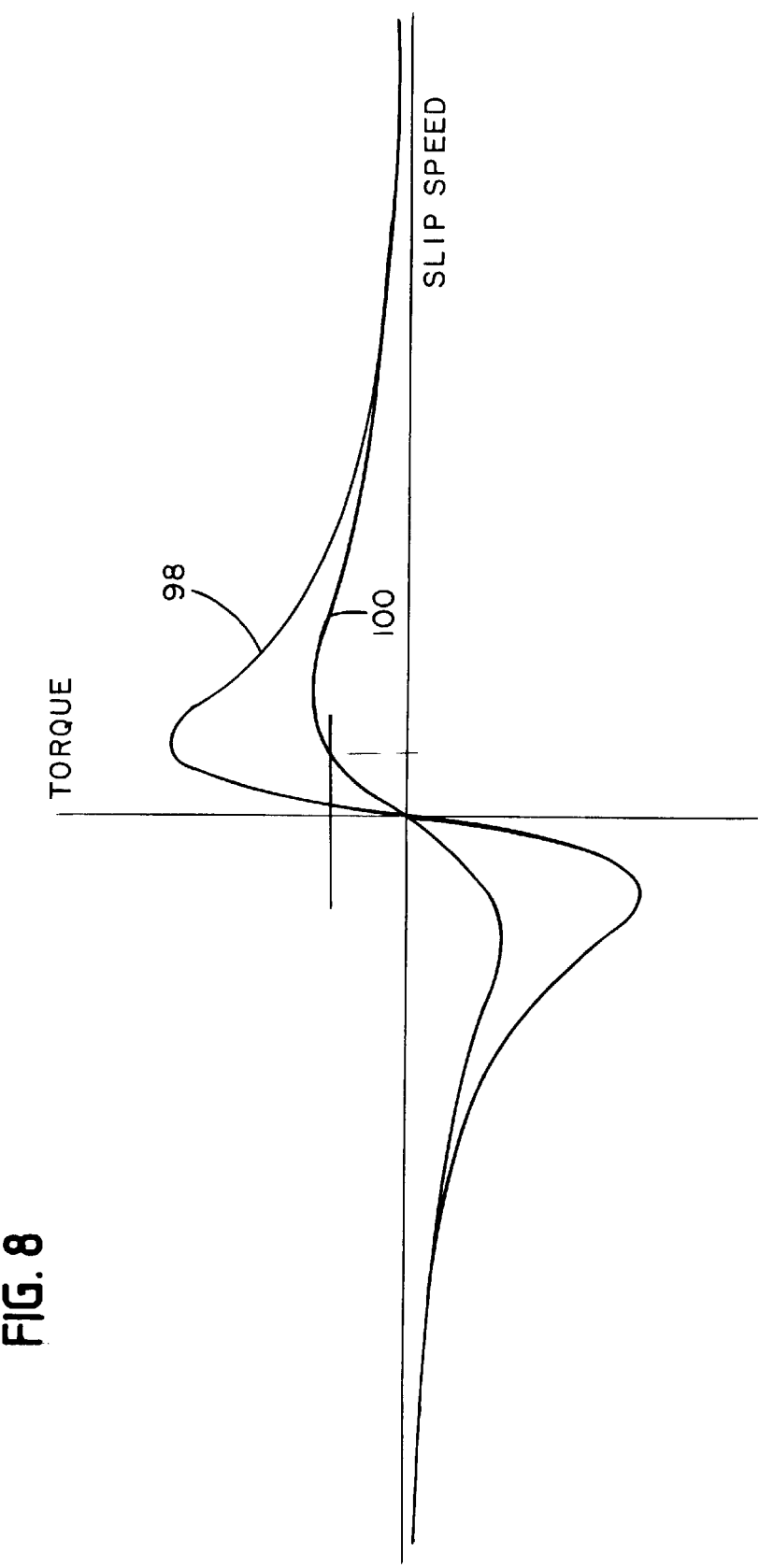
FIG. 8 is a graph of torque vs. slip speed curves relating to the diagram of FIG. 7.

FIG. 7 is a voltage vs. frequency diagram illustrating an AC motor drive signal from the motor controller 36 that can be used to improve low speed operation of the treadmill 10 where the standard relationship between voltage and frequency is shown by a line 92. As discussed above, a number of commercial treadmills use a three phase induction motor driven by a motor controller. In the preferred embodiment, the processor 56 has direct control of the six drive transistors 60A–64B in the motor controller 36 which apply to the motor armature windings 54A–C a three phase drive signal of varying amplitude and frequency. The three phases are offset in time by 120° as shown in FIG. 5 and present a sine wave/space vector voltage to the armature windings 54A–C. The voltage/frequency relationship is determined by the motors volt/hertz curve and the feedback signal from the speed sensor 68. The classical volt/hertz curve uses the desired motor speed as the driving signal frequency with sufficient amplitude to provide adequate torque. Implementing a volt/hertz curve where the motor has sufficient torque at low speed however causes the motor 38 to cog because of the finite number of poles (not shown) in the motor 38 and because the speed is not high enough for a reasonable sized flywheel (not shown) attached to the motor 38 to dampen out the vibrations. This cogging can cause large vibrations in the belt 28 which in turn are very uncomfortable to the user. The preferred solution is to smooth out the operation of the motor 38 so it does not generate any low speed vibrations. Another less desirable solution is to increase the mass of the flywheel which can become very expensive. To accomplish the preferred solution to this problem, the motor controller 36 applies drive signals having a frequency much higher than the desired motor speed to the motor armature windings 54A–C at low motor speeds. This generates high slip or difference between the frequency of the drive signals generating the circulating field in the motor 38 and the actual speed of the motor 38. This slip increases the frequency and decreases the amplitude of the cogging to the point of being smoothed out by the motor's flywheel. However, the higher frequency of the drive signals makes the motor 38 want to run at a much higher speed than desired. Therefore, in the preferred embodiment, the processor 56 using a feedback signal from the speed sensor 68 dynamically controls the amplitude of the driving signals applied to the armature windings 54A–C thereby keeping the motor 38 at the desired speed. A line 94 in FIG. 7 illustrates an example of how the motor controller 36 can reduce the amplitude of the driving signal to control motor speed. FIG. 8 is a set of two torque vs. slip speed curves where a curve 98 indicates the torque produced by the motor 38 without the reduction in drive signal amplitude and a curve 100 depicts the torque produced with the reduced amplitude as shown by the line 94 in FIG. 7. An envelope 96 between lines 92 and 94 shows an example of the area of operation of the high slip, low speed operation of the motor 38 according to this embodiment of the invention. Also, it is preferred that as the speed of the motor 38 increases, the amount of slip is reduced gradually and in a linear fashion shown by the volt vs. frequency line 94.

Another significant feature of the invention relates to the use of the power factor control circuit shown in FIG. 3. In order to facilitate the use of the AC motor such as motor 38 having sufficient horse power to drive the belt 28 at higher speeds while using a lower voltage power source such as the AC power sources 74, the power factor of the input current from the power source 74 is modified. In the preferred embodiment of the invention, the power factor control circuit 52 is inserted between the motor controller 36 and a rectifier 102 that in turn is connected to the two phase power source 74. In this case, the power factor control circuit 52 utilizes a boost converter having an inductor 104, a power transistor switch 106 and an output rectifier diode 108. The transistor 106 is controlled by a power factor controller IC 110, for example a Microlinear ML4812, that programs the motor control input current on line 72 to follow the rectified input voltage from the rectifier 102. This allows the impedance of the load on the power source 74 to appear more purely resistive thereby improving the power factor of the current input into the motor 38. The power factor control circuit 52 provides two performance advantages when used with the motor controller 36. First, more power can be drawn from the power source 74 because the improved power factor reduces the current at a given load. Second, the increased voltage motor 38 makes it possible to obtain higher torque out of the motor 38 at higher speeds.

It should be noted that the various features described above have been described in terms of their preferred embodiments in the context of the particular treadmill 10, motor 38 and motor control 36 disclosed herein. The manner in which these features can be implemented will depend upon a number of factors including the nature of the treadmill, the AC motor and the motor control. For example, there are many different types of electrical circuits and components that would be suitable for implementing power factor control and motor control which would be functionally equivalent to the preferred embodiments as well as within the scope of this invention.

We claim:

1. An exercise treadmill, comprising:
   a frame structure including two rotatable pulleys, said pulleys being positioned substantially parallel to each other, and a pair of spaced apart longitudinal frame members for providing longitudinal structural support for said frame structure wherein said frame structure has a frame resonance frequency;
   a three phase AC motor, having a plurality of armature windings, operatively connected to a first of said pulleys for rotating said first pulley;
   a belt secured over said pulleys so as to move in a longitudinal direction when said first pulley is rotated;
   a control system operatively connected to said motor;
   a control panel secured to said frame structure and operatively connected to said control system wherein said control panel includes at least one display and a first set of user controls for controlling the treadmill including said belt speed; and
   a motor controller, operatively connected to said control system, having a processor and a plurality of drive transistors operatively connected to said processor to apply drive signals, having varying amplitude and frequency with predetermined phases, to each of said armature windings wherein said processor applies a control signal to said drive transistors such that the phases of said drive signals are shifted a predetermined amount from said predetermined phases at the speed of said motor corresponding to said frame resonance frequency.

2. The exercise treadmill of claim 1 wherein said phase shifting occurs at zero crossings of said drive signals.

3. The exercise treadmill of claim 1 wherein said processor increases said phase shifting from a minimum speed of said motor to said predetermined amount at said motor speed corresponding to said frame resonance frequency and then decreases said phase shifting as said speed of said motor increases beyond said resonant frequency.

4. The exercise treadmill of claim 3 wherein said increase and decrease of said phase shifting are linear with respect to increases in the speed of said motor.

5. The exercise treadmill of claim 1 wherein said predetermined amount is approximately 2 percent.

6. An exercise treadmill, comprising:
   a frame structure including two rotatable pulleys, said pulleys being positioned substantially parallel to each other, and a pair of spaced apart longitudinal frame members for providing longitudinal structural support for said frame structure wherein said frame structure has a frame resonance frequency;
   a three phase AC motor, having a plurality of armature windings, operatively connected to a first of said pulleys for rotating said first pulley;
   a belt secured over said pulleys so as to move in a longitudinal direction when said first pulley is rotated;
   a control system operatively connected to said motor;
   a control panel secured to said frame structure and operatively connected to said control system wherein said control panel includes at least one display and a first set of user controls for controlling the treadmill including said belt speed; and
   a motor controller, operatively connected to said control system, having a processor and a plurality of drive transistors operatively connected to said processor to apply drive signals, having varying amplitude and frequency with predetermined phases, to each of said armature windings wherein said processor applies a control signal to said drive transistors such that at least one of said phases of said drive signals are staggered a predetermined amount from said predetermined phases at the speed of said motor corresponding to said frame resonance frequency.

7. The exercise treadmill of claim 6 wherein said predetermined amount of said phase staggering is approximately zero for a first of said phases, a minus 5 degrees for a second of said phases and a plus 5 degrees for a third of said phases.

8. An exercise treadmill, comprising:
   a frame structure including two rotatable pulleys, said pulleys being positioned substantially parallel to each other, and a pair of spaced apart longitudinal frame members for providing longitudinal structural support for said frame structure wherein said frame structure has a frame resonance frequency;
   a three phase AC motor, having a plurality of armature windings, operatively connected to a first of said pulleys for rotating said first pulley;
   a belt secured over said pulleys so as to move in a longitudinal direction when said first pulley is rotated;
   a control system operatively connected to said motor;
   a motor speed sensor operatively connected to said motor and said control system;

a control panel secured to said frame structure and operatively connected to said control system wherein said control panel includes at least one display and a first set of user controls for controlling the treadmill including said belt speed; and a motor controller, operatively connected to said control system, having a processor and a plurality of drive transistors operatively connected to said processor to apply drive signals, having varying amplitude and frequency to each of said armature windings wherein said processor responsive to said motor speed sensor applies at low motor speed a control signal to said drive transistors such that the frequency of said drive signals is substantially greater than the speed of the motor to generate a substantial slip in said motor.

9. The exercise treadmill of claim 8 wherein said processor also reduces the amplitude of said drive signal during said slip of said motor in order to regulate the speed of said belt.

10. An exercise treadmill, comprising:

a frame structure including two rotatable pulleys, said pulleys being positioned substantially parallel to each other, and a pair of spaced apart longitudinal frame members for providing longitudinal structural support for said frame structure wherein said frame structure has a frame resonance frequency;

a three phase AC motor, having a plurality of armature windings, operatively connected to a first of said pulleys for rotating said first pulley;

a belt secured over said pulleys so as to move in a longitudinal direction when said first pulley is rotated;

a control system operatively connected to said motor;

a motor speed sensor operatively connected to said motor and said control system;

a control panel secured to said frame structure and operatively connected to said control system wherein said control panel includes at least one display and a first set of user controls for controlling the treadmill including a plurality of predetermined speeds of said belt; and a motor controller, operatively connected to said control system, having a processor and a plurality of drive transistors operatively connected to said processor to apply drive signals, having varying amplitude and frequency, to each of said armature windings wherein said processor, responsive to said user controls and said motor speed sensor, applies a motor speed control signal, representing a first of said predetermined belt speeds, to said drive transistors such that said drive transistors apply a first set of voltages and frequencies to said armature windings to obtain said first belt speed and wherein if said first belt speed should decrease due to increased load on said belt as indicated by said motor speed sensor, said processor will increase said voltage applied by said drive transistors to said armature windings to maintain the belt speed at said first belt speed.

11. An exercise treadmill that utilizes a power source, comprising:

a frame structure including two rotatable pulleys, said pulleys being positioned substantially parallel to each other, and a pair of spaced apart longitudinal frame members for providing longitudinal structural support for said frame structure wherein said frame structure has a frame resonance frequency;

a three phase AC motor, having a plurality of armature windings, operatively connected to a first of said pulleys for rotating said first pulley;

a belt secured over said pulleys so as to move in a longitudinal direction when said first pulley is rotated;

a control system operatively connected to said motor;

a motor speed sensor operatively connected to said motor and said control system;

a control panel secured to said frame structure and operatively connected to said control system wherein said control panel includes at least one display and a first set of user controls for controlling the treadmill including a plurality of predetermined speeds of said belt;

a motor controller, operatively connected to said control system to apply drive signals, having varying amplitude and frequency to each of said armature windings; and a power factor control circuit, operatively connected between the power source and said motor control, for improving the power factor of the current applied to said motor controller from the power source.

12. The exercise treadmill of claim 11 including a rectifier connected between the power source and said power factor control circuit wherein said power factor control circuit includes an inductor and a switch connected to a line from the power source and operatively connected to a power factor controller.

13. The exercise treadmill of claim 12 wherein said switch is a power transistor.

* * * * *